Nov. 16, 1943.  T. E. McFALL  2,334,570
PISTON RING
Filed Oct. 7, 1940
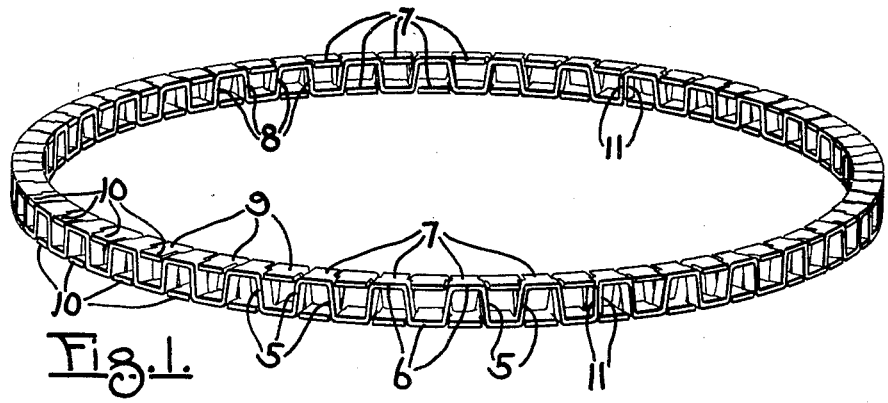
Fig. 1.
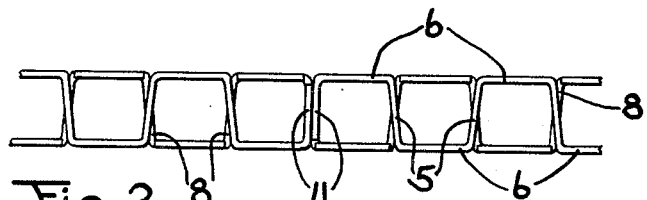
Fig. 2.
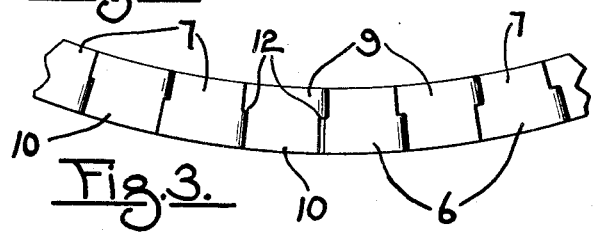
Fig. 3.
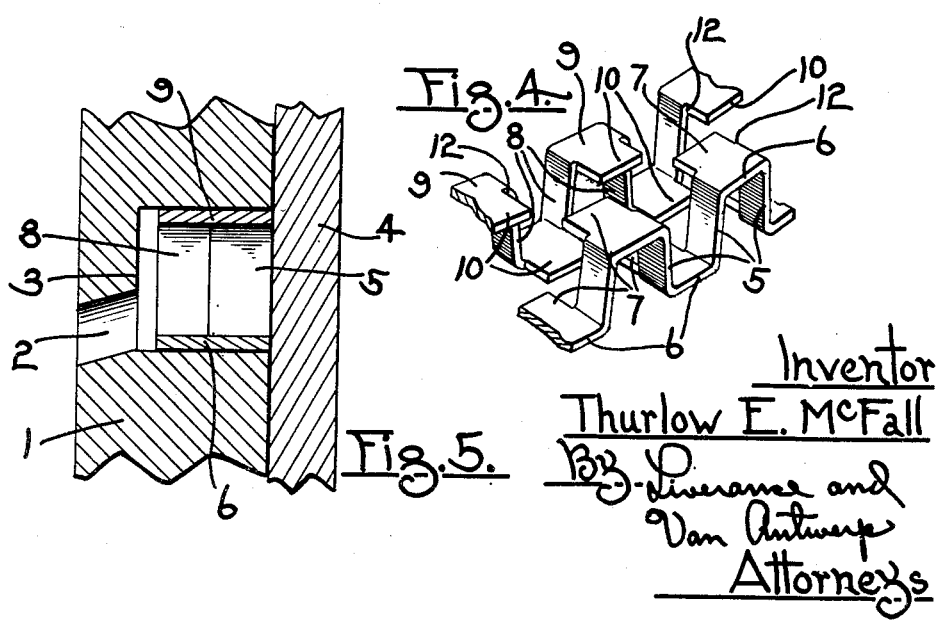
Fig. 4.
Fig. 5.
Inventor
Thurlow E. McFall
By Livermore and
Van Antwerp
Attorneys Patented Nov. 16, 1943

2,334,570

UNITED STATES PATENT OFFICE 2,334,570

PISTON RING

Thurlow E. McFall, Sparta, Mich.

Application October 7, 1940, Serial No. 360,072

2 Claims. (Cl. 309—45)

This invention relates to piston rings in general and particularly to those rings which are adapted to be inserted within the oil groove of a piston within an internal combustion engine.

It is a particular object of this invention to provide a ring made up of two ring segments which are interlocking throughout the entire length thereof.

Another object of the invention is to provide a ring made up of two ring segments each of which is similarly formed and which is made up of a continuous series of reversely bent loops.

A further object of this invention is to provide a ring of this nature made up of two ring segments each of which is circumferentially compressible so that each has a certain amount of outward thrust when placed within the walls of a cylinder.

A still further object is to provide a composite ring structure having two interlocking ring segments, the outer one of which has a certain amount of inherent tension therein and the inner one of which aids in expanding the outer ring so that a continuous surface will be presented to the cylinder wall at all points within the length of the stroke of the piston.

Yet another object of the invention is the provision of a ring which will have a great number of oil drainage passages therethrough and yet one which will be sufficiently flexible as to respond quickly to the changing surface of the cylinder wall thereby providing at all times an even outward pressure against the cylinder wall regardless of how worn such wall may have become.

Other objects and purposes of the invention will appear more fully as the description proceeds.

To the accomplishment of the foregoing and related ends said invention, then, consists of the means hereinafter fully described and particularly pointed out in the claims. The annexed drawing and following description set forth in detail certain means and one mode for carrying out my invention, said means constituting, however, but one of various ways in which the principle of the invention may be employed.

In said annexed drawing wherein like reference numerals refer to like parts throughout the various views:

Fig. 1 is a perspective view of the entire ring showing the two ring segments in assembled relation.

Fig. 2 is a somewhat enlarged fragmentary elevational view of the assembled ring.

Fig. 3 is a fragmentary top plan view thereof.

Fig. 4 is a fragmentary perspective view of the two ring segments in disassembled relation, and Fig. 5 is a fragmentary vertical section through the piston and cylinder wall showing the ring in the oil groove thereof.

Referring now more particularly to the drawing and especially to Fig. 5 there is disclosed the piston 1 having the oil drainage passage 2 therein, the oil ring groove 3 of the piston and the cylinder wall 4 against which the ring bears as the piston reciprocates.

The entire ring is made up of two similar ring segments. The outer ring segment is made up of a continuous series of reversely bent loops which include the substantially vertical leg portions 5 and the horizontal connecting portions 6 which connect the upper and lower edges of the leg portions 5 in alternate relationship so that in both the upper and lower edges of the ring segment there is presented alternately open and closed portions as clearly shown in Fig. 4. Each of the horizontal connecting portions 6 of the outer ring segment is provided with inwardly extending portions 7 making each of these horizontal portions having a radial depth equal to the complete radial depth of the assembled ring. It will be obvious that a ring having this formation is adapted to be circumferentially compressed and when so compressed within the walls of the cylinder it will exert a certain amount of pressure radially outwardly against the walls of the cylinder, and the outer edge of the respective leg portions 5 and connecting portions 6 will present a continuous edge bearing against the cylinder wall.

The inner ring segment is similarly constructed and is made up of a continuous series of reversely bent loops including the substantially vertical leg portions 8 and the substantially horizontal connecting portions 9 which connect alternately the upper and lower edges of adjacent legs in the same manner as previously described with respect to the outer ring segment. Each of the horizontal portions 9 is provided with an outwardly extending portion 10 which makes each of the horizontal portions at the upper and lower sides of the ring segment of a radial depth equal to the complete radial depth of the assembled ring.

Each of the ring segments is provided at its outer end with an additional extended portion 11 which may be bent into a vertical plane substantially as shown in Figs. 1 and 2 and abut against each other when the ring is compressed and may also be separated at that point.

It is to be noted that the width of each of the extensions 7 and 10 is such that a shoulder 12 will be provided at each side thereof substantially equal to the thickness of the material used so that when the two ring segments are assembled the corresponding shoulders 12 on each of the outer and inner ring segments may bear against each other. The extensions 7 on the horizontal portions of the outer ring segment are adapted to be received between adjacent leg portions 8 on the inner ring member and, conversely, each of the extensions 10 on the horizontal connecting portions 9 of the inner ring segment will be received between adjacent leg portions 5 on the outer ring segment thereby providing an interlocking arrangement between the two segments to make up the entire ring structure.

In order that the radial pressure of each ring segment may be the same and so that the tension of the outer segment will be equalized by that of the inner segment I may make the radial depth of the leg portions on the outer segment greater than the depth of the leg portions on the inner segment, as clearly shown in Figs. 3 and 5.

I prefer to form these ring segments of steel or any other suitable material and since they are complementary in formation they may be stamped by a single stamping operation from a single length of material and when this is done it will be obvious that practically no waste will result. The two ring segments may be stamped from a single length of material and then each subjected to the bending operation which provides the series of reversely bent loops in each segment and when curved to form a complete ring, that side of the inner ring segment which presents a continuously smooth line will be concave while the corresponding side of the outer ring member will be convex. Both segments are adapted to be circumferentially compressed by having the end members thereof in abutting relationship and when in assembled relation and compressed within the piston ring groove and located within the walls of the cylinder there will be a pressure exerted by the outer ring member which is complemented by a similar pressure from the inner ring member which is radially outwardly and which is substantially the same at all points around the ring. This is essential because in cylinders which are badly worn a ring of this nature is sufficiently flexible to bear with equal force outwardly against the cylinder wall regardless of how out of round the cylinder may be.

It is to be further noted that I prefer to make the radial depth of the assembled ring less than the depth of the groove into which the ring is to be placed so that there is no outward pressure which depends upon any portion of the ring contacting the bottom of the ring groove. This feature is clearly shown in Fig. 5.

The advantages of this ring will be apparent from the foregoing explanation to those conversant with the art and the economic advantages will be immediately apparent upon consideration of the fact that the entire ring may be stamped from a single length of material.

Other modes of applying the principle of my invention may be used instead of the one here explained, change being made as regards the mechanism herein disclosed provided, however, that the means stated by any of the following claims or the equivalent of such stated means be employed.

I claim:

1. A piston ring for internal combustion engines comprising, two interlocking ring segments, the outer ring segment including a continuous series of reversely bent loops having substantially vertical leg portions and substantially horizontal portions alternately connecting the upper and lower edges of said leg portions, the inner ring segment also including a continuous series of reversely bent loops having substantially vertical leg portions and horizontal portions connecting the leg portions thereof at alternate upper and lower edges, the horizontal connecting portions of the outer ring segment having rearwardly extending portions thereon located between adjacent leg portions of the inner ring segment, and the horizontal connecting portions of the inner ring segment having forwardly extending portions thereon located between the leg portions of the outer ring member.

2. The combination of elements defined in claim 1, wherein the leg portions of the outer ring segment have a greater radial depth than the leg portions of the inner ring segment.

THURLOW E. McFALL.